Dec. 16, 1924.
A. B. MARSHALL
1,519,868
SUCTION CLEANING APPARATUS
Original Filed March 4, 1918
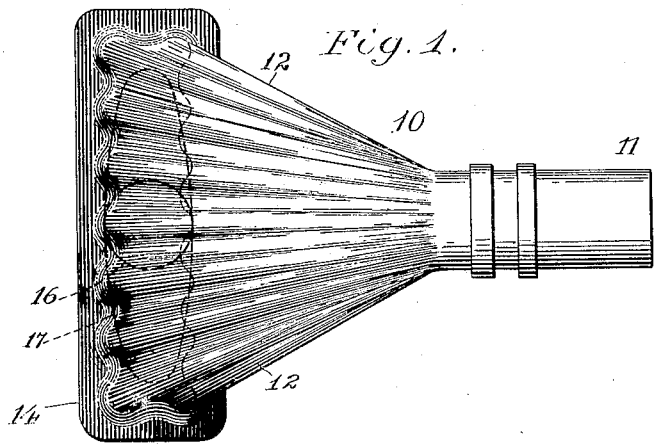
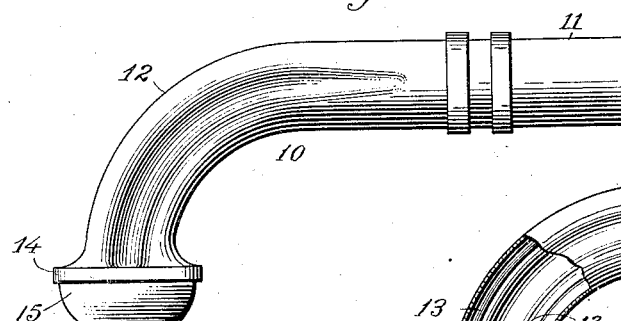
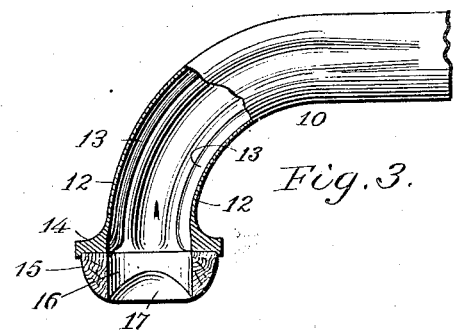
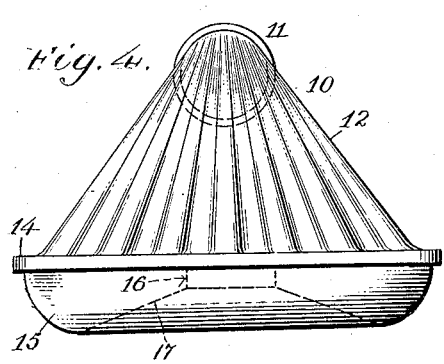
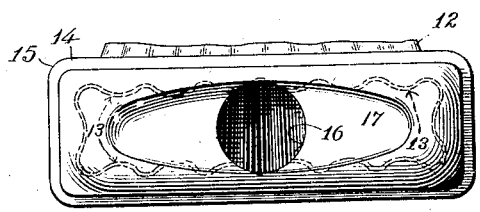
Inventor
Aquila B. Marshall
BY Conrad A. Dieterich
his ATTORNEY.

Patented Dec. 16, 1924.

1,519,868

UNITED STATES PATENT OFFICE.

AQUILA B. MARSHALL, OF BROOKLYN, NEW YORK, ASSIGNOR TO AMERICAN RADIATOR COMPANY, OF CHICAGO, ILLINOIS, A CORPORATION OF NEW JERSEY.

SUCTION CLEANING APPARATUS.

Application filed March 4, 1918, Serial No. 220,133. Renewed April 30, 1924.

*To all whom it may concern:*

Be it known that I, AQUILA B. MARSHALL, a citizen of the United States, residing at the city of New York, borough of Brooklyn, Kings County, in the State of New York, have invented certain new and useful Improvements in Suction Cleaning Apparatus, of which the following is a full, clear, and exact specification.

This invention relates to improvements in suction cleaning apparatus, and the same has for its object more particularly to provide a tool for use in connection therewith, whose efficiency will not be impaired during the use thereof.

Further, said invention has for its object to provide a tool of this type which is so constructed that foreign matter cannot lodge therein during the use thereof.

Further, said invention has for its object to provide a tool of this type in which the outlet opening cannot become closed or partially closed by foreign matter drawn within the tool.

Further, said invention has for its object to provide a tool of this type with means for preventing foreign matter from adhering to the inner surfaces of the walls thereof.

Further, said invention has for its object to provide a tool of this type with means to cause a current of air to flow over and under any foreign matter which may tend to contact with or adhere to the walls thereof.

Further, the invention has for its object to provide a tool of this type with grooves or channels in the inner surfaces of its walls.

Further, the invention has for its object to provide a tool of this type with corrugated walls.

Further, the invention has for its object to provide a tool of this type with a body portion having inlet and outlet openings and grooves within the walls of the body portion arranged intermediate said openings.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawing showing an illustrative embodiment of the invention, Figure 1 is a plan or top view of a suction cleaning tool constructed according to and embodying the invention;

Fig. 2 is a side elevation view thereof;

Fig. 3 is a view similar to Fig. 2, parts being shown in section;

Fig. 4 is a front elevational view of the tool, and

Fig. 5 is an inverted plan view thereof, part being broken away.

Heretofore, in tools of this type, it has been the practice to provide the walls of the tool with smooth inner surfaces. When such tools are used it is found that thin, flat substances, such as paper or the like, which may be drawn into the tool, are liable to adhere to the inner surfaces of the walls thereof, being held in such position by the pressure of the current of air passing through the tool. As a result of such action the tool soon becomes so clogged by the paper or other foreign matter which lodges within the tool that the outlet opening will be completely closed, and the due operation of the tool entirely prevented. The principal object of the present invention is to provide a tool of this type, which will overcome the disadvantages above mentioned.

Referring to the drawing, the suction cleaning tool 10 comprises an annular neck 11, the rear end of which is adapted to be connected in the usual manner to one end of a suitable tubular handle having its other end connected to the suction hose of the vacuum cleaning system.

The front end of the neck 11 communicates with the rear end of a hollow, flaring body portion 12 having its forwardly diverging walls provided upon their inner surfaces with a plurality of tapering grooves or channels 13 extending longitudinally of said body portion 12, and radiating in a forward direction from the front end of the neck 11. While the grooves 13 upon the inner surfaces of the walls of the body portion 12 may be formed in any suitable manner, they are preferably formed by corrugating the walls of the body portion, as shown in the drawings. The body portion 12 is preferably curved downwardly intermediate its ends, and at its front end the walls thereof merge with an outwardly extending peripheral flange 14.

Secured to the under surface of the flange 14 is a block 15 within the upper portion of which is formed a circular hole 16 extending downwardly part way through the block 15 and having its upper or inner end communicating with the interior of the hollow body portion 12. At its lower or outer end the hole 16 communicates with the inner end of a flaring recess 17 formed in the under side of the block 15 and terminating at the outer or bearing surface of the block 15 in an elongated suction slot constituting with the flaring recess 17 and the hole 16 the intake opening of the tool.

The cross-sectional area of the hole 16 formed in the upper portion of the block 15 is preferably the same as the cross-sectional area of the neck 11 in order to prevent any matter being drawn into the tool that cannot pass readily through the neck 11.

In operation the neck 11 of the tool is secured to the operating handle in the usual manner, and the tool is advanced over the surface to be cleaned with the outer or bearing surface of the block 15 in engagement therewith. It will of course be understood, that any dirt or foreign matter that may be upon the surface to be cleaned will be drawn into the tool through the suction slot of the block 15 and will be discharged therefrom through the neck 11, constituting the outlet opening of the tool.

Should a piece of paper or other flat substance entering the tool tend to adhere to the inner surfaces or walls thereof, the same will at once be prevented from so doing since either surface thereof, as a whole, cannot come into contact, at one time, with the adjacent inner surface or wall of the tool, owing to the undulating character of said surface or wall. As a result the incoming air will be caused to travel simultaneously over and under said piece of paper or other material, and in so doing agitate the same to such extent as to break any adhesion which may occur between said paper or material and the inner surface of the tool, and thus permit the former to be carried off. As a consequence of this action of the current of air flowing through the grooves 13, any paper or the like which may be drawn into the tool will be compelled to pass therethrough and will not be permitted to remain therein, thereby insuring that the tool will not be rendered inoperative by reason of paper or the like lodging within the same and closing or blocking the outlet opening thereof.

Having thus described my said invention what I claim and desire to secure by Letters Patent is:—

1. A suction cleaning tool comprising a body portion having inlet and outlet openings, and having a plurality of contiguous channels formed in the walls thereof extending from said inlet opening to said outlet opening, substantially as specified.

2. A suction cleaning tool comprising a body portion having inlet and outlet openings therein, and a plurality of contiguous, converging channels in the walls thereof intermediate said inlet and outlet openings, substantially as specified.

3. A suction cleaning tool comprising a body portion having inlet and outlet openings therein, and a plurality of contiguous, converging, tapering channels in the walls thereof intermediate said inlet and outlet openings, substantially as specified.

4. A suction cleaning tool comprising a body portion provided with a chamber having inlet and outlet openings communicating therewith; the walls of said chamber having a plurality of contiguous channels formed therein extending in the direction of the flow of air through said chamber and diminishing gradually in depth from said inlet opening to said outlet opening, substantially as specified.

5. A suction cleaning tool comprising a body portion provided with a chamber having inlet and outlet openings communicating therewith, the walls of said chamber having a plurality of contiguous channels formed therein separated from one another by tapering convex portions; said channels extending in the direction of the flow of air through said chamber and diminishing gradually in depth from said inlet opening to said outlet opening, substantially as specified.

6. A suction cleaning tool comprising a body portion provided with a chamber having inlet and outlet openings communicating therewith, the walls of said chamber being provided with a plurality of straight tapering grooves extending longitudinally thereof from said inlet opening to said outlet opening and diminishing gradually in depth from said inlet opening to said outlet opening, substantially as specified.

7. A suction cleaning tool comprising a body portion provided with a chamber having inlet and outlet openings communicating therewith, the walls of said chamber being provided with a plurality of contiguous, converging grooves of gradually diminishing depth extending from said inlet opening to said outlet opening, substantially as specified.

8. A suction cleaning tool comprising a body portion provided with a chamber having inlet and outlet openings communicating therewith, the entire walls of said chamber intermediate said inlet and outlet openings being corrugated longitudinally, substantially as specified.

Signed at the city of New York, in the county and State of New York, this 20th day of February, one thousand nine hundred and eighteen.

AQUILA B. MARSHALL.

Witnesses:
CONRAD A. DIETERICH,
WILLIAM P. JONES.